United States Patent
Steele, Jr.

(10) Patent No.: US 6,295,601 B1
(45) Date of Patent: *Sep. 25, 2001

(54) SYSTEM AND METHOD USING PARTIAL TRAP BARRIER INSTRUCTION TO PROVIDE TRAP BARRIER CLASS-BASED SELECTIVE STALL OF INSTRUCTION PROCESSING PIPELINE

(75) Inventor: Guy L. Steele, Jr., Lexington, MA (US)

(73) Assignee: Sun Micro Systems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,101

(22) Filed: May 30, 1997

(51) Int. Cl.[7] ................................... G06F 9/44
(52) U.S. Cl. ............................ 712/244; 712/245
(58) Field of Search ................... 395/591, 595, 395/553; 712/244, 245

(56) References Cited

U.S. PATENT DOCUMENTS

| | | | |
|---|---|---|---|
| 5,012,403 | * | 4/1991 | Keller et al. .......................... 712/228 |
| 5,263,169 | * | 11/1993 | Genusov et al. ................. 395/800.07 |
| 5,305,455 | * | 4/1994 | Anschuetz et al. .................. 709/100 |
| 5,307,483 | * | 4/1994 | Knipfer et al. .................. 395/182.08 |
| 5,479,616 | * | 12/1995 | Garibay, Jr. et al. ................. 712/212 |
| 5,764,942 | * | 6/1998 | Kahle et al. .......................... 395/390 |
| 5,796,939 | * | 8/1998 | Berc et al. ....................... 395/183.21 |
| 5,802,374 | * | 9/1998 | Gupta et al. .......................... 395/706 |

* cited by examiner

Primary Examiner—Meng-Ai T. An
Assistant Examiner—Gautam R. Patel
(74) Attorney, Agent, or Firm—Cesari and McKenna, LLP

(57) ABSTRACT

A new "partial trap barrier" instruction can be inserted in an instruction stream to cut off trap shadows of instructions of a respective one of a plurality of particular classes associated with each instruction. Several criteria may be used to assign instructions to trap barrier classes, including (i) explicit encoding of a trap barrier value which is contained in the respective instructions; (ii) resource(s) of the processor which is or are used in their execution, and (iii) where the instructions are located in the instruction stream in relation to the partial trap barrier instructions in the instruction stream. When the processor executes a partial trap barrier instruction in a particular class, while an earlier instruction in the same class is casting its trap shadow, the processor will stall the pipeline in connection with an instruction of the same class after the partial trap barrier instruction in the pipeline, as well as instructions in the instruction stream subsequent thereto. When the earlier instruction's trap shadow terminates, the processor can resume processing of the stalled and subsequent instructions. However, if no instruction in the instruction stream enters the pipeline prior to termination of the earlier instruction's trap shadow, the pipeline will not stall.

36 Claims, 5 Drawing Sheets

SYSTEM AND METHOD USING PARTIAL TRAP BARRIER INSTRUCTION TO PROVIDE TRAP BARRIER CLASS-BASED SELECTIVE STALL OF INSTRUCTION PROCESSING PIPELINE

FIELD OF THE INVENTION

The invention relates generally to the field of digital computer systems, and more particularly to processors (including microprocessors) usefull in such systems. The invention particularly relates to "trap shadowing" in pipelined processors.

BACKGROUND OF THE INVENTION

Processors used in digital computer systems process data in accordance with a series of instructions which comprise an instruction stream. Typically, each instruction will contain one or more elements, which can include, for example, an operation code that identifies the particular operation to be performed, one or more source operand specifier(s) which identify storage locations in the respective digital computer system which contain the data, or "operands," on which the operation is to be performed, and a destination operand specifier which identifies a storage location in the system in which the processed data is to be stored. Some types of instructions may only comprise operation codes, particularly if they are provided to control the sequence of operations in the instruction stream, while other types of instructions also include the source and destination operand specifiers.

Typically a processor performs a series of general phases in connection with processing of an individual instruction including:

(i) decoding the instruction's operation code to determine the type of operation to be performed, and coincidentally to identify the number of operands, if any;

(ii) if the instruction requires operands, retrieving the operands from the storage locations identified by the instruction;

(iii) performing the operation required by the instruction; and (iv) storing the result in the storage location identified by the instruction.

A processor could perform each of the above-identified phases in series for each successive instruction in the instruction stream in series, with very little if any overlap. In that case, for example, the processor would begin decoding the operation code of instruction (s+1) of the instruction stream (phase (i) above) after the result generated for instruction (s) of the instruction stream (phase (iv) above) has been stored.

Each of the phases (i) through (iv) can generally be performed by different circuit elements in a processor, and so so-called "pipelined" processors were developed in which each of the phases could be performed concurrently with the other phases, but for different instructions in the instruction stream. See, for example, Peter M. Kogge, *The Architecture Of Pipelined Computers* (McGraw-Hill Book Company, 1981) (hereinafter, "Kogge"). A pipelined processor may execute successive instructions in an instruction stream, in successive phases (i) through (iv), such that, while, for example, the processor is storing the result of (phase (iv) above) of instruction(s), it will concurrently be (a) performing the operation required by instruction (s+1) in connection with its operands (phase (iii) above), (b) retrieving the operands required by instruction (s+2) (phase (ii) above), and (c) decoding the operation code of instruction (s+3) (phase (i) above).

It will be appreciated that, if a sequence of four instructions (s) through (s+3) in an instruction stream can be processed concurrently in this manner, the instructions can be processed in seven time steps rather than the sixteen time steps that would be necessary in a non-pipelined processor. In many cases, sequences of instructions from an instruction stream can be executed in this manner, which can lead to substantially reduced processing time and increased through-put. As described in Kogge, processors having a variety of other, more complex pipelines have been developed.

Problems can arise, however, in connection with pipelined execution of instructions. During processing, unusual conditions variously known as "faults," "traps" or "exceptions" (generally "exceptions") may be encountered which need to be handled. A number of types of exceptions may arise during processing. The specific types of exceptions are generally determined by the particular architecture which defines the operation of a particular type of processor; the types of exceptions that are provided for one particular type of microprocessor, which is constructed in accordance with the SPARC Version 9 architecture, is described in the SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"), chapter 7.

When a processor detects an exception in connection with processing of an instruction, it calls an exception handler to process the exception, that is, to perform selected operations as required by the exception condition. Two general methodologies have been developed for handling exception conditions. In one methodology, which is representative of computers whose processors follow a "precise" exception handling model, if an exception condition is detected during processing of an instruction, the exception handler is invoked immediately following operations performed for the instruction. On the other hand, in a second methodology, which is representative of processors whose architectures specify a "delayed" exception handling model, if an exception is detected during processing of an instruction, the exception handler is not invoked until some point after the processor has sequenced to processing an instruction after the instruction for which the exception was indicated. Some architectures make use of both the precise and delayed exception handling models for different types of exceptions.

In both methodologies, the processor will generally need to retain certain exception status information, perhaps for some time, after the instruction for which an exception condition is detected so that, when the exception handler is invoked, it has the information which it needs to process the exception. One benefit of the handling exception conditions according to the precise exception handling model is that, since the exception handler is processed immediately after the processing of the instruction which gave rise to the exception condition, the exception status information needed by the exception handler will be directly available and need not be saved beyond processing for the program instruction which gave rise to the exception condition.

With exceptions handled according to the delayed exception handling model, however, the processor will generally need to ensure that certain exception status information be retained, perhaps for some time, after the floating point instruction for which an exception condition is detected so that, if the exception handler is eventually invoked, it has the information which it needs to process the exception. The instruction which causes an exception condition which is handled according to the delayed exception handling model casts a "trap shadow" over subsequent instructions in the instruction stream, the trap shadow representing the time following the execution phase of an instruction, to the point at which if an exception condition would have occurred in connection with processing of the instruction, the exception condition would actually have occurred. Otherwise stated, if an exception condition is detected in connection processing of an instruction, the exception condition will have been detected by the end of the trap shadow. Different types of instructions can have trap shadows of different lengths, but generally the length of an instruction's trap shadow can be predicted a fortiori based on the type of processing operation to be performed while the instruction is being executed.

To accommodate pipelining in such an environment, the programmer (in the case of a program written in assembly language) or compiler (in the case of a program written in a high-level language), will need to ensure that instructions in the instruction stream which follow an instruction which may cause a trap will not use the same resources of the processor as those which are used to retain the exception status information. Since the actual number of instructions which may fall into the instruction shadow can be difficult to predict, some architectures provide for a particular instruction, called a "trap barrier" instruction, which the assembly language programmer (if the program is being written in the assembly language of the particular processor on which the program is to be processed) or the compiler (if the program is being written in a high-level language) can insert into the instruction stream at some point after respective instructions which can result in exception conditions which can serve to cut off trap shadows. In particular, if execution of an instruction(s) can result in a exceptional condition, the trap barrier instruction can be inserted into the instruction stream at instruction (s+b) (b=1, 2, . . .). The trap barrier instruction effectively stalls processing of instructions in the pipeline after the trap barrier instruction until the processor has completed processing of the instructions preceding the trap barrier instruction, at least to a point at which it (that is, the processor) can determine whether an exceptional condition can be detected in connection with processing of instructions preceding the trap barrier instruction, that is, until the end of the trap shadows of all of the instructions preceding the trap barrier instruction in the pipeline. When trap barrier instruction is provided in an instruction stream, it essentially cuts off trap shadows for all of the instructions preceding it in the instruction stream. However, since each trap barrier instruction in the instruction stream also "stalls" the pipeline whether or not an exception condition is detected, they can result in a significant decrease in the processing performance that may otherwise be provided by the pipelining of the processor.

SUMMARY OF THE INVENTION

The invention provides a new and improved system and method for a "partial" trap barrier facility for a processor or microprocessor used in a digital data processing system, which facility enables the processor to have instructions in an instruction stream that may have multiple overlapping trap shadows, associated with various classes, and stall the instruction pipeline only if an instruction of a particular class is in the trap shadow of an earlier instruction in the pipeline. Accordingly, as long as instructions in an instruction stream, in an earlier instruction's trap shadow, are associated with classes other than that associated with an earlier instruction, those instructions can be processed without stalling the pipeline, which can assist in enhancing processing throughput for the processor.

In brief summary, invention provides for a new instruction, identified herein as a "partial trap barrier" instruction, which can be inserted in an instruction stream to cut off trap shadows of instructions of a respective one of a plurality of particular classes associated with each instruction. Described herein are several illustrative trap barrier classification criteria, including (i) assignment of instructions based on an explicit encoding of a trap barrier value which is contained in the respective instructions;

(ii) assignment of instructions based on selected resource(s) of the processor which is or are used in their execution, and (iii) assignment of instructions based on where they are located in the instruction stream in relation to the series of partial trap barrier instructions in the instruction stream.

When the processor executes a partial trap barrier instruction in a particular class, while an earlier instruction in the same class is casting its trap shadow, the processor will stall the pipeline in connection with the partial trap barrier instruction in the pipeline, as well as subsequent instructions in the instruction stream. When the earlier instruction's trap shadow terminates, the processor can resume processing of the stalled and subsequent instructions. However, if no partial trap barrier instruction of the same class in the instruction stream enters the pipeline prior to termination of the earlier instruction's trap shadow, the pipeline will not stall, which can enhance processing throughput.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
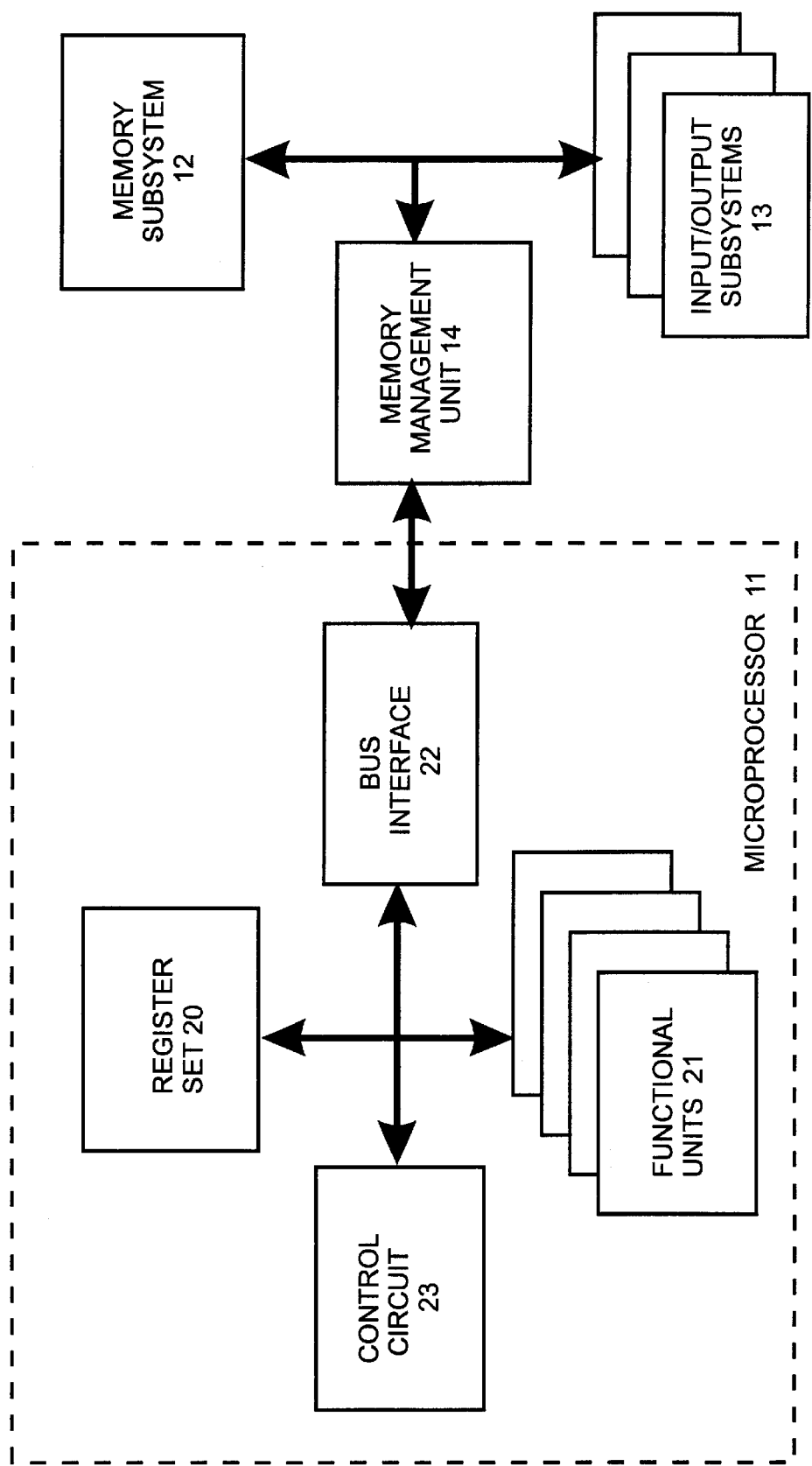
FIG. 1 is a functional block diagram of a digital computer system including a pipelined microprocessor which provides for improved trap shadow handling in connection with a partial trap barrier instruction, constructed in accordance with the invention.

FIG. 1 is a functional block diagram of a digital computer system 10 including a pipelined microprocessor 11 which provides for improved trap shadow handling constructed in accordance with the invention. With reference to FIG. 1, the digital computer system 10 includes the microprocessor 11, which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC Architecture Manual, Version 9". The microprocessor 11 generally includes a number of elements, including a register set 20, one or more functional units 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage. In a microprocessor constructed in accordance with the SPARC Version 9 architecture, transfer of data between registers comprising the register set 20, on the one hand, and the memory subsystem or a particular one of the input/output subsystems 13 is controlled by particular load (in the case of transfers to the registers) and store (in the case of transfers from the registers) instructions.

The microprocessor 11 processes instructions in a pipelined manner, as will be described in connection with FIG. 2. That is, typically the microprocessor 11 executes instructions in four general phases, namely:

(i) an instruction decode phase ("INST DECODE") during which it decodes the operation code to determine the type of operation to be performed, and coincidentally to identify the number of operands, if any;

(ii) an operand fetch phase ("OPERAND FETCH") during which, if the instruction requires operands, it retrieves the operands from the storage locations identified by the instruction;

(iii) an execute phase ("EXECUTE") during which the operation required by the instruction is performed; and (iv) a result storage phase ("OPERAND STORE") during which, if the instruction enables the microprocessor 11 to generate result data, the microprocessor stores the generated result data in the particular storage location identified by the instruction.

These phases are generally controlled by the control circuit 23 (FIG. 1).

Figure 2:
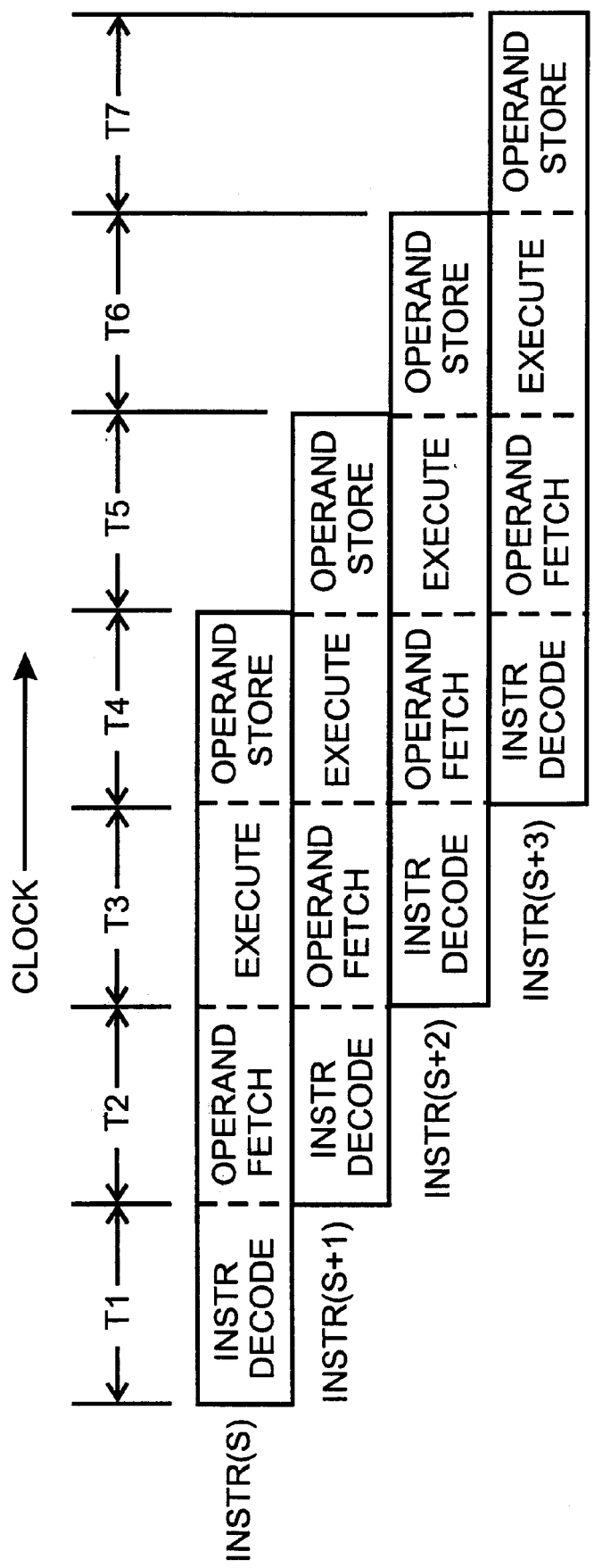
FIG. 2 is a timing diagram illustrating timing in connection with execution of instructions in which a pipeline that is not stalled.
Figure 3:
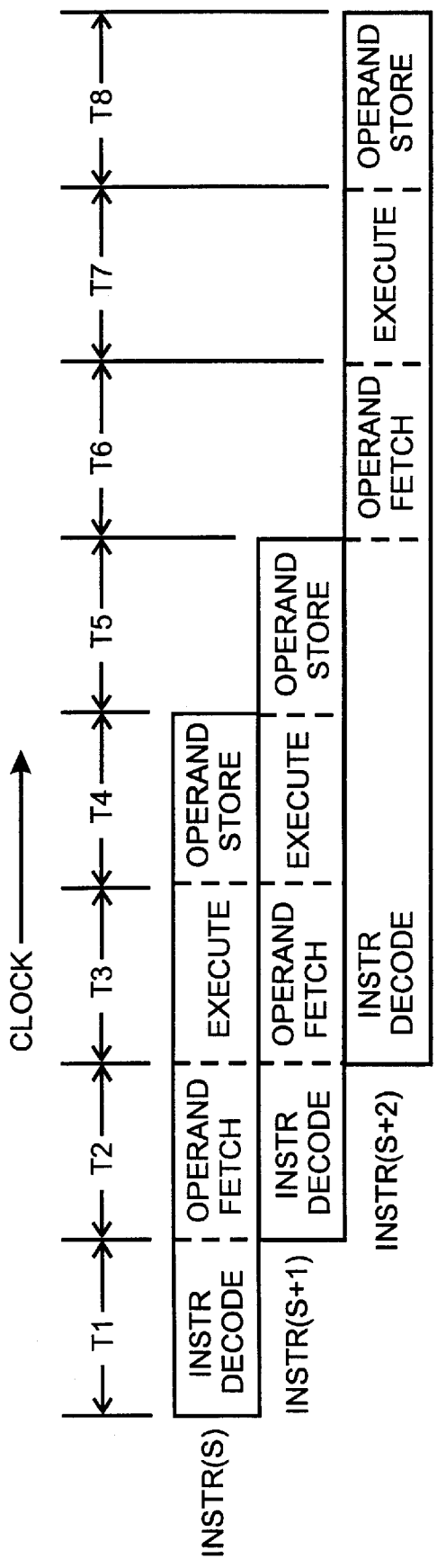
FIG. 3 is a timing diagram illustrating timing in connection with execution of instructions in which a pipeline that is stalled.

FIG. 2 depicts the timing with which the microprocessor 11 executes phases (i) through (iv) of successive instructions INST(S) through INST(S+3) in its pipeline during successive ticks T1, T2, ... (generally "Ti") of a clock signal (not shown). Since the microprocessor 11 has a four-phase pipeline, it can have four instructions in the pipeline at any point in time. In addition, the microprocessor can be in the process of fetching the next instruction INST(S+4) (not shown) in the instruction stream, from, for example, the memory subsystem 12 or from a cache (not shown), which can be added to the pipeline when it has finished execution of instruction INST(S). As shown in FIG. 3, during each clock tick Ti, the microprocessor can be performing a different one of the phases (i) through (iv) for each of the respective instructions INST(S) through INST(S+3) in the pipeline. For example, during the result storage phase (phase (iv)) for instruction INST(s), during which the destination register of register set 20 stores the result data generated during execution of instruction INST(S) (represented by the block labeled "OPERAND STORE") during clock tick T4, concurrently (a) the functional units 21 will perform the operation required by the next instruction INST(S+1) (phase (iii) above) in connection with its operands during the execute phase (represented by the block labeled "EXECUTE") of that instruction INST(S+1), (b) the source register(s) of register set 20 will provide the operands required by the next instruction INST(S+2) (phase (ii) above) during the operand fetch phase (represented by the block labeled "OPERAND FETCH") of that instruction INST(S+2), and (c) the instruction INST(S+3) will be decoded (phase (i) above) during the instruction decode phase (represented by the block labeled "INST DECODE") of that instruction INST(S+3) to identify the operation to be performed and the source register(s), if any, to be used to provide the operands, all during in the same clock tick T4. Similar operations can occur for each instruction in the instruction stream, as long as the pipeline does not stall. Although in FIG. 2, the time required to perform all of the phases is depicted as being the same for the illustrative instructions INST(S) through INST (S+3), it will be appreciated that the time for performing particular phases may differ as among different instructions and different types of instructions; for example, the time required to perform the EXECUTE phase will normally differ as between integer instructions and floating point instructions, and, indeed, may differ as among different types of floating point instructions. In addition, the time required to execute load and store instructions may differ significantly from the time required to perform other types of instructions.

Furthermore, the particular operations described in connection with each of the phases may differ among different types of instructions. For example, certain types of instructions do not have source operands, in which case the OPERAND FETCH phase may be skipped and the EXECUTE phase may be performed in the second phase instead of the third phase. In addition, certain types of instructions do not have destination identifiers in which case the OPERAND STORE phase may be skipped. Furthermore, for types of instructions relating to, for example, copying of information from one register to another, which may not require use of a functional unit 21, can be accomplished in a single phase after the INST DECODE phase (which may be termed an OPERAND FETCH/STORE) phase, without requiring an EXECUTE phase and separate OPERAND FETCH and OPERAND STORE phases; it will be appreciated, however, that it will be desirable for such an information copy instruction to ensure that, if the register from which information is to be transferred is the destination of an earlier instruction in the instruction stream, the microprocessor 11 has completed the OPERAND STORE phase of the earlier instruction before the information copy instruction is executed.

With a four-phase pipeline as shown in FIG. 2, when the microprocessor has finished execution of one instruction, such as instruction INST(S), in the pipeline, it will normally add the next instruction in the instruction stream, illustratively an instruction INST(S+4) (not shown), whose instruction decode phase can be performed during clock tick T5. These operations will generally be repeated for each subsequent instruction in the pipeline, with some exceptions.

One illustrative exception will be described in connection with FIG. 3. Depending on a number of conditions that can arise in connection with processing of instructions in the instruction stream, the pipeline can "stall." That is, during processing of one instruction in an instruction stream, the microprocessor can delay execution of certain phases of one or more subsequent instructions in the instruction stream, or it can delay adding an instruction from the instruction stream to the pipeline, when it concludes execution of an earlier instruction. This will be illustrated in connection with the instruction execution timing diagram depicted in FIG. 3. As shown in FIG. 3, the instruction decode phase of the execution of instruction INST(S+2) (represented by the block labeled "INST DECODE") is extended for two additional clock ticks, namely, from clock tick T3 to clock tick T5, and the operand fetch phase (represented by the block labeled "OPERAND FETCH") is delayed until clock tick T6. This may occur, for example, if the microprocessor 11 determines, for example, that at least one operand used in execution of instruction INST(S+2) is generated during execution of instruction INST(S+1). In that case, the microprocessor will delay the operand fetch phase of instruction INST(S+2) (represented by the block labeled "OPERAND FETCH") until at least the operand has been generated during the execute phase, and perhaps (as shown in FIG. 3) until after the result operand generated for instruction INST(S+1) has been stored in the destination register during the result storage phase of instruction INST(S+1) (represented by the block labeled "OPERAND STORE"). If that occurs, the execute and operand store phases (phases (iii) and (iv)) of instruction INST(S+2) will also be delayed, until clock ticks T7 and T8, respectively. Since the pipeline has been stalled for instruction INST(S+2), the execution of instruction INST(S+3) (not shown in FIG. 3) will also be delayed, so that the instruction decode phase of instruction INST(S+3) will begin during clock tick T6), and the instruction decode phase of the next instruction INST(S+4) (also not shown) in the instruction stream will not begin until at least clock tick T7.

In another exception, the pipeline may be flushed, that is, as a result of processing of an instruction INST(S) in the instruction stream, the processing of subsequent instructions INST(S+1), INST(S+2) and INST(S+3) in the pipeline may be terminated, and the pipeline refilled with other instructions. This may occur as a result of a discontinuity in the instruction stream, which may occur as a result of a jump or branch to another part of the instruction stream. In addition, this may occur as a result of detection of, for example, a trap or exception condition, which will enable the microprocessor 11 to at least temporarily suspend processing of the instruction steam that includes the instruction which gave rise to the trap or exception condition, and enable it (that is, the microprocessor 11) to begin processing of a separate exception handler routine.

With this background, the invention provides an arrangement which provides for use of a trap barrier instruction to cut off trap shadows for handling of exception conditions in connection with execution of instructions by the microprocessor 11. In particular, the invention provides a mechanism by which multiple trap shadows associated with respective instructions in an instruction stream can overlap in a pipeline. In this mechanism, the various instructions which can cast trap shadows are divided into a plurality of classes, each of which is associated with a corresponding one of a plurality of classes of partial trap barrier instructions. Each class of partial trap barrier instruction, when provided at a particular point in the instruction stream, will serve to cut off at that point trap shadows of any instructions of the same class that are in the instruction stream upstream of the partial trap barrier instruction associated with the particular class, while not cutting off trap shadows for instructions which are not in the class. The partial trap barrier instruction will operate to stall the pipeline only until completion of instructions in the instruction stream which belong to the particular class that is associated with the partial trap barrier instruction.

When the microprocessor 11 encounters a partial trap barrier instruction, if the partial trap barrier instruction is in the trap shadow of an instruction upstream of the partial trap barrier instruction which is also of the same class, the pipeline will be stalled until it (that is, the microprocessor 11) has executed the upstream instruction(s) to the point at which it can verify that the upstream instructions will not trap, or, if the upstream instructions have trapped, after the appropriate exception handler has been called to process the trap. Accordingly, the invention allows for enhanced processing throughput, by limiting pipeline stalls to those needed to ensure completion of instructions of the class defined by the partial trap barrier instruction.

A number of criteria may be selected to assign instructions to the particular partial trap barrier classes. Illustrative trap barrier classification criteria include (i) assignment of instructions based on an explicit encoding of a trap barrier value which is contained in the respective instructions;

(ii) assignment of instructions based on selected resource(s) of the microprocessor which is or are used in their execution, and (iii) assignment of instructions based on where they are located in the instruction stream in relation to the series of partial trap barrier instructions in the instruction stream.

Arrangements in which each of these trap barrier classification assignment criteria are utilized will be described below in connection with FIGS. 4 through 7

Illustrative instruction assignment criteria (i) and (ii) will both be described in connection with FIG. 6. By way of background, for illustrative trap barrier classification criterion (i), that is, assignment of instructions to particular partial trap barrier classes based on an explicit encoding of a trap barrier value which is contained in the respective instructions, each of the instructions is provided with a tag value that is associated with a particular one of the classes. That is, an "n" bit trap barrier class identifier field, in each of the instructions associated with partial trap barrier classes is used to identify the particular class with which the respective instruction is associated. Each partial trap barrier instruction will also be provided with a trap barrier class identifier value, and, when executed, will enable the control circuit 23 to stall the instruction pipeline until it (that is, the control circuit 23) has completed execution of all prior instructions in the instruction stream with the same partial trap barrier class identifier value. Thus, instructions in the various trap barrier classes, which are defined by the different trap barrier class identifier values, can cast separate overlapping trap shadows. The overlapping trap shadows for instructions associated with the respective trap barrier classes will be separately cut off by partial trap barrier instructions which are associated with the respective classes. Thus, when a partial trap barrier instruction associated with one partial trap barrier class is executed, it will stall the pipeline only if the pipeline contains a previous instruction from the instruction stream that is associated with the same class. Thus, if the instruction (p) in the instruction stream is a partial trap barrier instruction associated with one trap barrier class (c), if all previous instruction(s) (p−1), (p−2) . . . , (p−b) in the execution pipeline are associated with other trap barrier classes (generally, c', c'≠c), the pipeline will not stall and the control circuit 23 can continue execution of instructions following the partial trap barrier instruction. On the other hand, if a previous instruction (p') (p'<p) in the pipeline is associated with the same trap barrier class as the partial trap barrier instruction, the partial trap barrier instruction (p) will stall the pipeline for that instruction (p) and instructions thereafter until execution of instruction (p') has proceeded to a point at which it can verify that the instruction (p') will not trap, or the appropriate exception handler has been called and processed. Thereafter, the control circuit 23 can execute the subsequent instruction (p+1) and instructions thereafter in a similar manner.

It will be appreciated that the various trap barrier classes may be indicated with binary-encoded class identifier values, in which case the "n" bit trap barrier class identifier field can identify $2^n$ classes, and each instruction and partial trap barrier instruction will be associated with one of the trap barrier classes. On the other hand, each of the "n" bits in the trap barrier class identifier field can be used to identify one of the trap barrier classes, in which case the "n" bit field can identify "n" classes. In the latter case (that is, if each of the "n" bits identifies one of "n" trap barrier classes), each instruction in the instruction stream can be associated with more than one trap barrier classes. If an instruction is associated with multiple trap barrier classes, a partial trap barrier instruction associated with any of the classes can serve to cut off the instruction's trap shadow.

The assignment of instructions to particular trap barrier classes may be defined by the architecture of the microprocessor, such that the assignments are fixed for each type of instruction that is provided in the microprocessor's architecture. Alternatively, the assignment may be made by the assembly language programmer when developing the program, or by the compiler when the program is compiled.

For illustrative trap barrier classification criterion (ii), that is, assignment of instructions to partial trap barrier classes based on selected resource(s) of the microprocessor which is or are used in their execution, the partial trap barrier classes may be selected to be based on, for example, particular one(s) of the functional units 21 which are to be used in executing the instruction, or the particular one(s) of the registers in the register set 20 which are to be used as source or destination registers. In that case, the association of instructions to the various partial trap barrier classes will be based on encodings of one or more of the existing fields of the instruction.

For example, if an instruction is assigned to a partial trap barrier class based on the particular functional unit 21 to be used in executing the instruction, the assignment may be determined by the particular encoding of the instruction's operation code field. A partial trap barrier instruction in an instruction stream which identifies one of the functional units 21 can effectively stall the pipeline in connection with instructions which are executed by the same functional unit. This can occur for each previous instruction (p') in the pipeline which uses the functional unit 21 identified by the partial trap barrier instruction, as indicated by the operation code field of the instruction (p'). At that point, the partial trap barrier instruction will stall the pipeline for it and subsequent instructions, if any, in the pipeline, until execution of instructions in the pipeline upstream of the partial trap barrier instruction which are executed by the same functional unit 21 either has progressed to a point at which it is determined that the instructions will not trap, or after the appropriate trap handlers have been processed if one or more of the upstream instructions do trap. Thereafter, the processing of partial trap barrier instruction and subsequent instructions in the instruction stream can proceed.

Similarly, if the association of instructions to partial trap barrier classes is determined by the registers which are to be used in executing the instruction, the association will be determined by one or more of the fields which identify the registers to be used during execution of the instruction. It may be particularly useful, for example to associate the partial trap barrier classes with the particular destination registers used for the respective instructions, that is, the registers in which the microprocessor 11 stores the results generated during instruction execution. In that case, for each instruction in the instruction stream, one or more of the, for example, high-order bits of the instruction which identify the destination register can be also used to identify the particular partial trap barrier class with which the instruction is associated. This will also effectively serve to divide the registers in the register set 20 into a number of sub-sets R1, R2, . . . RN (generally identified by "Rn"), with each sub-set Rn being associated with one of the "N" binary encodings of the high-order bits. A partial trap barrier instruction in an instruction stream which identifies one of the sub-sets of register set 20 will effectively stall the pipeline in connection with instructions whose destination registers are in the sub-set that is associated with the partial trap barrier instruction.

That is, an instruction in the instruction stream preceding the partial trap barrier instruction (p) does not cause instruction (p) to stall if it does not use a register in the same register sub-set as the destination register identified by the partial trap barrier instruction. However, a partial trap barrier instruction in an instruction stream which identifies a register sub-set can effectively stall the pipeline in connection with instructions having a destination register in the same register sub-set. This can occur for each previous instruction (p') for which the destination register is in the register sub-set associated with the partial trap barrier instruction. At that point, the partial trap barrier instruction (p) will stall the pipeline, until execution of instructions already in the pipeline upstream of the partial trap barrier instruction whose destination registers are in the same sub-set either has progressed to a point at which it is determined that the instructions will not trap, or after the appropriate trap handlers have been processed if one or more of the upstream instructions do trap. Thereafter, the processing of the partial trap barrier instruction and subsequent instructions in the instruction stream may proceed.

Figure 4:
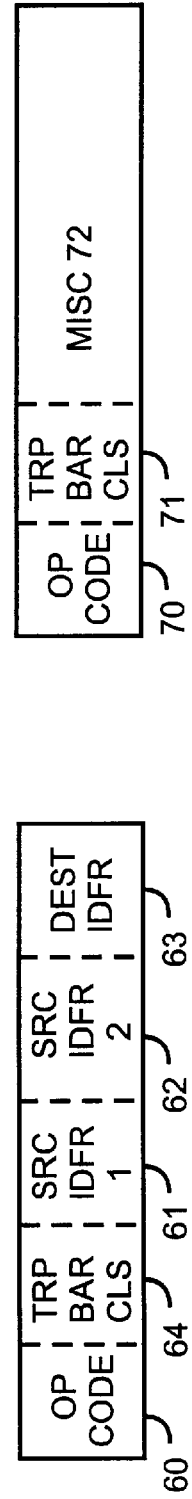
FIG. 4 illustrates the format of an illustrative conventional instruction.
Figure 5:
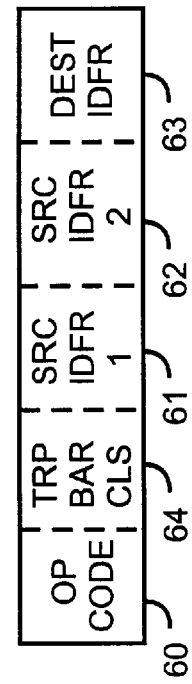
FIG. 5 illustrates the format of an illustrative partial trap barrier instruction useful in connection with the invention.

FIGS. 4 and 5 depict formats for instructions (in particular, instructions, such as arithmetic, control or other types of instructions than the partial trap instruction) identified by reference numeral 50 and the partial trap barrier instruction 51, which are used particularly in connection with illustrative trap barrier classification criterion (i) above. As shown in FIG. 4, the format for an instruction 50 includes, as is conventional, an operation code field 60 for the operation code, and may also include fields for one or more source register identifiers and a destination register identifier. The operation code field 60 contains an operation code that identifies the particular operation to be performed in response to the instruction. Instruction 50 depicted in FIG. 4 is shown as including two source register identifier fields 61 and 62 and one destination register identifier field 63, which identify, respectively, the registers whose contents are to be used in processing the instruction, and the register in which the result is to be stored. It will be appreciated that, depending on the type of operation to be performed as indicated in the operation code field 60, the instruction may have more or fewer source register identifier fields, and may also include no destination reference identifier field 63. In addition, in accordance with the invention, the instruction 50 includes a trap barrier class field 64 which identifies the particular partial trap barrier class with which the particular instruction is associated.

The partial trap barrier instruction 51, which is shown in FIG. 5, comprises two fields, including an operation code field 70 and a trap barrier class field 71, and in addition may contain other fields generally identified as a miscellaneous field 72. The operation code field 70 contains an operation code that identifies the instruction as a partial trap barrier instruction. The trap barrier class field 71 contains a trap barrier class identifier value that identifies a particular trap barrier class. The miscellaneous field 72 may contain other information, or it may contain padding if the instructions defined by the microprocessors's instruction set architecture are of uniform length and the fields 70 and 71 do not provide the necessary length.

The format of a partial trap barrier instruction used in connection with illustrative trap barrier classification criterion (ii) above (that is, in which instructions are assigned to a respective partial trap barrier class based on selected resource(s) of the microprocessor which is or are used in their execution) can be similar to instruction 51 (FIG. 5). On the other hand, it will be appreciated that other instructions need not include a trap barrier class field 64, since the classes to which they are assigned will be determined by the operation code field 60 if, for example, the partial trap barrier class is based on the particular functional unit 21 which is to be used in executing the instruction, or one or more of the source or destination register fields 61, 62, or 63, if the partial trap barrier class is based on the register(s) which are to provide one or more of the source operand or the register in which the result is to be stored.

Figure 6:
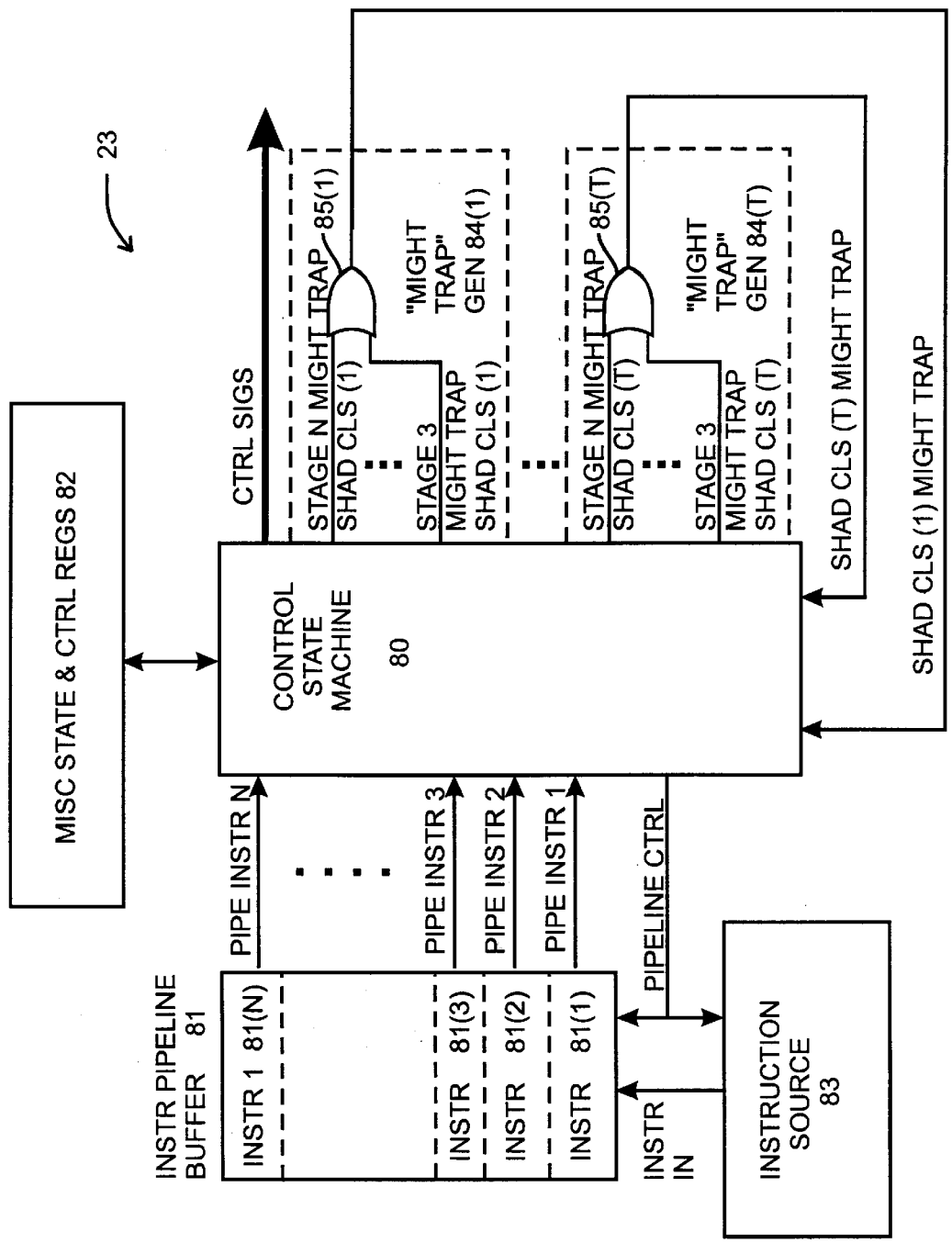
FIG. 6 is a functional block diagram of one embodiment of a control circuit useful in the microprocessor depicted in FIG. 1.

FIG. 6 depicts a functional block diagram of an illustrative embodiment of control circuit 23 for controlling operations of the microprocessor 11 in connection with the illustrative trap barrier classification criteria (i) and (ii) above. For the control circuit 23, it will be assumed that, since the partial trap barrier instruction has no source operands, after it is decoded in the first, "instruction decode" phase of the pipeline, it is executed in the second phase. With reference to FIG. 6, the control circuit 23 includes a control state machine 80, an instruction pipeline buffer 81, miscellaneous state and control registers 82 and a plurality of "might trap" generators 84(1) through 84(T) (generally identified by reference numeral 84(t)), one "might trap" generator 84(t) being provided for each trap barrier class.

Generally, the control state machine 80 generates control signals CTRL_SIGS which are provided to control other elements of the microprocessor 11 (FIG. 1). The control state machine 80 generates the control signals in response to instructions in the instruction pipeline buffer 81 and state information in the miscellaneous state and control registers 82.

The instructions in the pipeline, as described above, are retrieved from an instruction source 83, such as an instruction cache (not shown) or the memory subsystem 12 (FIG. 1), and loaded into the instruction pipeline buffer 81. The instruction pipeline buffer 81 effectively forms a FIFO (first-in, first-out) buffer, including a plurality of entries 81(1) through 81(N) (generally identified by reference numeral 81(n). Each entry 81(n) will store an instruction in the pipeline, and index "n" will be associated with the particular phase in the pipeline being executed for the instruction in the entry 81(n). The entries 81(n) provide respective PIPE INST 1 through PIPE INST N pipelined instruction 1 through N signals (generally identified as "PIPE INST n" signals), which are based on the particular instruction in the respective entry 81(n), and which serve to control the control state machine 80 in connection with execution of the respective instruction. In a microprocessor which implements a four-phase pipeline as illustratively described above, the instruction pipeline buffer 81 will generally have four entries 81(n), one for each instruction which may be in the pipeline at any particular time. As the control circuit 23 finishes processing of an instruction INST (S), which will be located in the last entry 81(4) in the instruction pipeline buffer 81, the other instructions INST (S+1) through INST(S+3), respectively located in entries 81(3) through 81(1), can each sequence to entries 81(2) through 81(4), and a new instruction INST(S+4) can be retrieved from the instruction source 83 and loaded in entry 81(1) of the instruction pipeline buffer 81. The loading of the instructions in the pipeline buffer 81 and the sequencing of the instructions through the pipeline buffer 81 are controlled in response to PIPELINE_CTRL pipeline control signals generated by the control state machine 80.

In addition to the CTRL_SIGS control signals and the PIPELINE_CTRL signal, in accordance with the invention the control state machine 80 also generates a plurality of STAGE n MIGHT TRAP SHAD CLASS (t) stage "n" might trap for shadow class (t) signals (where index "n" ranges from 3 through N). The control state machine 80 asserts one of the STAGE n MIGHT TRAP SHAD CLASS (t) signal if (i) the instruction in entry 81(n) of the pipeline buffer 81 is associated with the particular trap barrier class "t;" and (ii) an exception condition may arise in connection with its execution, that is, the instruction's trap shadow is still in existence.

STAGE n MIGHT TRAP SHAD CLASS (t) stage "n" might trap for shadow class (t) signals need only be generated for entries 81(3) through 81 (N) since the partial trap barrier instruction is executed while it is in the entry 81(2) of the instruction pipeline buffer, and the control state machine 80 may enable the pipeline to be stalled only in connection with instructions in entries 81(3) through 81(N), which will comprise those instructions in the instruction stream prior to the partial trap barrier instruction. The "might trap" generator $84(t_X)$ associated with a particular trap barrier class $T_X$ receives all of the STAGE n MIGHT TRAP SHAD CLASS $(t_X)$ signals associated with that particular trap barrier class $t_X$ and asserts a SHAD CLASS $(t_X)$ MIGHT TRAP shadow class signal if any of the STAGE n MIGHT TRAP SHAD CLASS ($t_X$) signals is asserted, which will be the case if any entry 81(3) through 81(N) contains an instruction of trap barrier class $t_X$ for which an exception condition may yet arise. Each "might trap" generator 84(t) comprises an OR gate 85(t) which generates an asserted SHAD CLS (t) MIGHT TRAP signal if any of the STAGE n MIGHT TRAP SHAD CLASS (t) for the associated trap barrier class is asserted. If none of the STAGE n MIGHT TRAP SHAD CLASS (t) for the associated trap barrier class is asserted, the OR gate 85(t) does not assert the SHAD CLS (t) MIGHT TRAP signal.

The control state machine 80 uses the SHAD CLS (t) MIGHT TRAP shadow class (t) might trap signals from the "might trap" generators 84(t) to determine whether to stall the pipeline in connection with trap shadows of instructions in entries 81(3) through 81(N) of the instruction pipeline buffer. That is, if the entry 81(2) of the instruction pipeline buffer 81 contains a partial trap barrier instruction for a particular partial trap barrier class $t_C$, in execution of the instruction the control state machine 80 will stall the pipeline at that entry 81(2) if the associated SHAD CLS ($t_C$) MIGHT TRAP shadow class $t_C$ might trap signal is asserted. The control state machine 80 will continue execution of the instructions in the entries 81(3) through 81 (N) of the instruction pipeline buffer 81, and, when the SHAD CLS ($t_C$) MIGHT TRAP signal is later de-asserted, will continue execution of the instruction in entry 81(1). While it is stalling the pipeline, the control state machine 80 may insert "NOP" (no operation) instructions in the pipeline at entry 81(3), which will enable no operation to occur.

Figure 7:
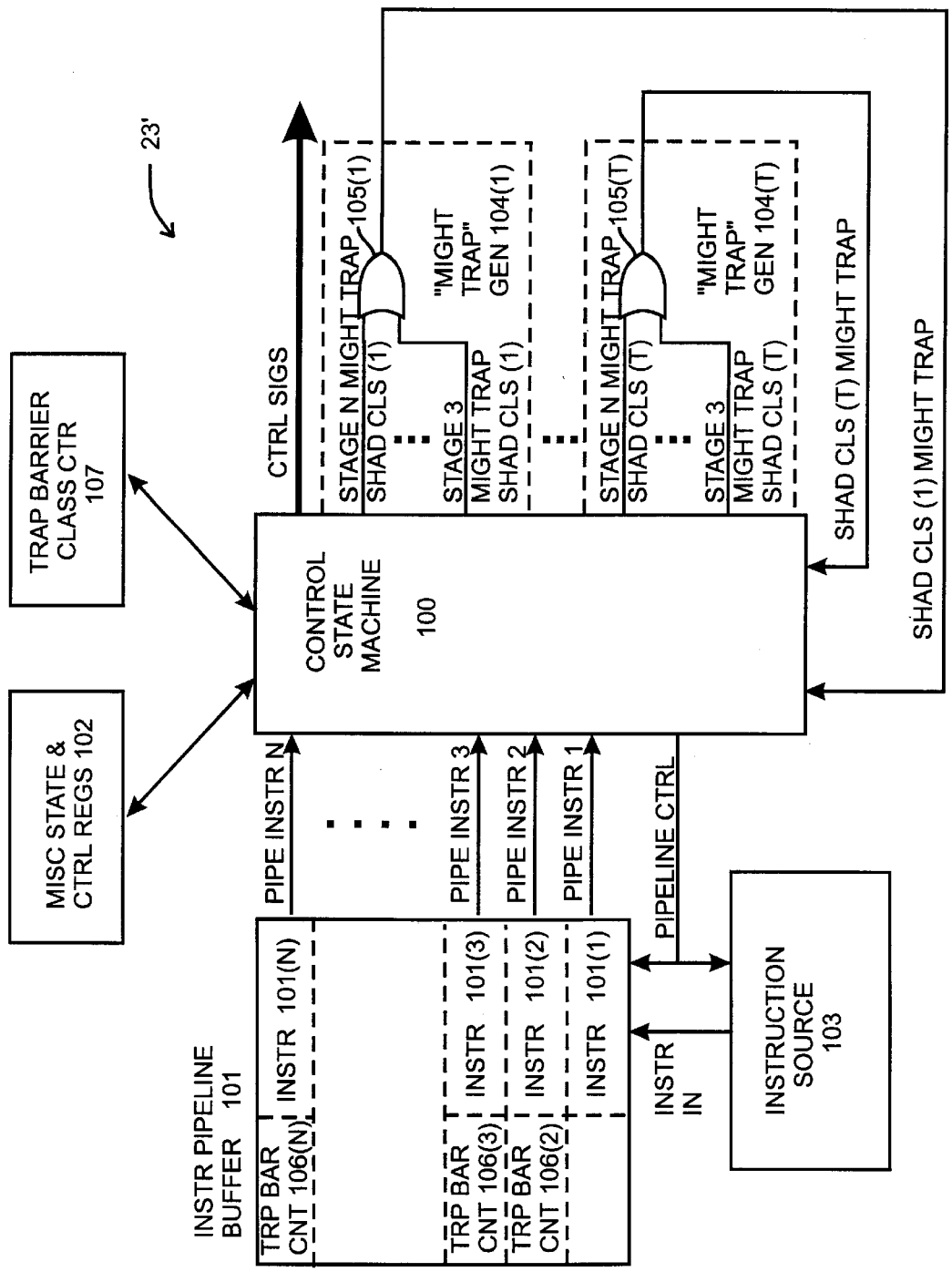
FIG. 7 is a functional block diagram of a second embodiment of a control circuit useful in the microprocessor depicted in FIG. 1.

FIG. 7 depicts a functional block diagram of a control circuit 23' useful in connection with illustrative trap barrier classification criterion (iii), in which instructions are assigned to classes based on where they are located in the instruction stream in relation to the most recently executed partial trap barrier instruction. For illustrative trap barrier classification criterion (iii), the instructions other than the partial trap barrier instruction may have formats similar to those described above in connection with the general instructions used in connection with illustrative trap barrier classification criterion (i), that is, they may be similar to instruction 50 (FIG. 4), without the trap barrier classification field 64. On the other hand, the partial trap barrier instruction used in connection with the illustrative trap barrier classification criterion (iii) may have a format similar to that described above in connection with partial trap barrier instruction 51 (FIG. 4), without the trap barrier class field 71. As will be described below in connection with FIG. 5, the particular class assigned to a particular instruction is based on the value of a class counter which provides values zero through C–1, whose value is incremented, modulo the value "C," when a partial trap barrier instruction is executed.

As shown in FIG. 7, the control circuit 23' includes a control state machine 100, an instruction pipeline buffer 101, miscellaneous state and control registers 102 and "might trap" generators 104(n). As with the control state machine 80 used in control circuit 23, the control state machine 100 generates control signals CTRL_SIGS which are provided to control other elements of the microprocessor 11 (FIG. 1). The control state machine 100 generates the control signals in response to instructions in the instruction pipeline buffer 101 and state information in the miscellaneous state and control registers 102.

The instructions in the pipeline are retrieved from an instruction source 103, such as an instruction cache (not shown) or the memory subsystem 12 (FIG. 1), and loaded into the instruction pipeline buffer 101. As with instruction pipeline buffer 81, the instruction pipeline buffer 101 forms a FIFO (first-in, first-out) buffer, including a plurality of entries 101(1) through 101(N) (generally identified by reference numeral 101(n)). Each entry 101(n) will store an instruction in the pipeline, and index "n" will be associated with the particular phase in the pipeline being executed for the instruction in the entry 101(n). The entries 101(n) provide respective PIPE INST 1 through PIPE INST N pipelined instruction 1 through N signals (generally identified as "PIPE INST n" signals), which are based on the particular instruction in the respective entry 81(n), and which serve to control the control state machine 100 in connection with execution of the respective instruction. In a microprocessor which implements four-phase pipeline as illustratively described above, the instruction pipeline buffer 101 will generally have four entries 101(n), one for each instruction which may be in the pipeline at any particular time. As the control circuit 23' finishes processing of an instruction INST(S), which will be located in the last entry 101(4) in the instruction pipeline buffer 101, the other instructions INST(S+1) through INST(S+3), respectively located in entries 101(3) through 101(1), can each sequence to entries 101(2) through 101(4), and a new instruction INST(S+4) can be retrieved from the instruction source 103 and loaded in entry 101(1) of the instruction pipeline buffer 101. The loading of the instructions in the pipeline buffer 81 and the sequencing of the instructions through the pipeline buffer 81 are controlled in response to PIPELINE_CTRL pipeline control signals generated by the control state machine 80.

In accordance with the invention, as noted above, a trap barrier class counter, identified in FIG. 7 by reference numeral 107, is provided, and at least entries 101(2) through 102(N) in the instruction pipeline buffer 101 is also provided with a trap barrier count field 106(n). While an instruction is entry 101(2) of the instruction pipeline buffer 101 during the second phase of its execution, the control state machine 100, in addition to performing the operations to be performed in connection with the particular phase, also loads a tag value into the trap barrier count field 106(2). For instructions other than the partial trap barrier instruction, the tag value loaded into trap barrier count field 106(2) corresponds to the count value provided by trap barrier counter 107. On the other hand, if the instruction in entry 101(2) is a partial trap barrier instruction, the control state machine 80 first increments the trap barrier class counter 107, and then loads a tag value into the trap barrier count field 106(2) which corresponds to the count value provided by the trap barrier counter. The tag value in the trap barrier count field 106(n) identifies the particular trap barrier class associated with the instruction in the entry 101(n), and is transferred through the instruction pipeline buffer 101 with the associated entry 101(n). In addition, the tag values in fields 106(n) are provided to the control state machine 100 as part of the PIPE INST n signals.

As with control state machine 80, in addition to the CTRL_SIGS control signals and the PIPELINE_CTRL signal, the control state machine 100 also generates a plurality of STAGE n MIGHT TRAP SHAD CLASS (t) stage "n" might trap for shadow class (t) signals (where index "n" ranges from 3 through N). The control state machine 100 asserts one of the STAGE n MIGHT TRAP SHAD CLASS (t) signal if (i) the instruction in entry 101(n) of the pipeline buffer 101 is associated with the particular trap barrier class "t," as indicated by the tag value in associated trap barrier count field 106(n); and (ii) an exception condition may arise in connection with its execution, that is, the instruction's trap shadow is still in existence.

STAGE n MIGHT TRAP SHAD CLASS (t) stage "n" might trap for shadow class (t) signals need only be generated for entries 101(3) through 101(N) since the partial trap barrier instruction is executed while it is in the entry 101 (2) of the instruction pipeline buffer, and the control state machine 100 may enable the pipeline to be stalled only in connection with instructions in entries 101(3) through 101(N), which will comprise those instructions in the instruction stream prior to the partial trap barrier instruction. The "might trap" generator 104($t_X$) associated with a particular trap barrier class $T_X$ receives all of the STAGE n MIGHT TRAP SHAD CLASS ($t_X$) signals associated with that particular trap barrier class $t_X$ and asserts a SHAD CLASS ($t_X$) MIGHT TRAP shadow class signal if any of the STAGE n MIGHT TRAP SHAD CLASS ($t_X$) signals is asserted, which will be the case if any entry 101(3) through 101(N) contains an instruction of trap barrier class $t_X$ for which an exception condition may yet arise. Each "might trap" generator 104(t) comprises an OR gate 105(t) which generates an asserted SHAD CLS (t) MIGHT TRAP signal if any of the STAGE n MIGHT TRAP SHAD CLASS (t) for the associated trap barrier class is asserted. If none of the STAGE n MIGHT TRAP SHAD CLASS (t) for the associated trap barrier class is asserted, the OR gate 105(t) negates the SHAD CLS (t) MIGHT TRAP signal.

The control state machine 100 uses the SHAD CLS (t) MIGHT TRAP shadow class (t) might trap signals from the "might trap" generators 104(t) to determine whether to stall the pipeline in connection with trap shadows of instructions in entries 101(3) through 101(N) of the instruction pipeline buffer. That is, if the entry 101(2) of the instruction pipeline buffer 101 contains a partial trap barrier instruction whose tag value in the trap barrier count field 106(2) contains a particular value $t_C$, in execution of the instruction the control state machine 100 will stall the pipeline at that entry 101(2) if the associated SHAD CLS ($t_C$) MIGHT TRAP shadow class $t_C$ might trap signal is asserted. The control state machine 100 will continue execution of the instructions in the entries 101(3) through 101(N) of the instruction pipeline buffer 101, and, when the SHAD CLS ($t_C$) MIGHT TRAP signal is later negated, will continue execution of the instruction in entry 101(1). While it is stalling the pipeline, the control state machine 100 may insert "NOP" (no operation) instructions in the pipeline at entry 101(3), which will enable no operation to occur.

It will be appreciated that a partial trap barrier instruction can be inserted into a program under direction of a programmer during program development, or automatically by a compiler or assembler.

The invention provides a number of advantages. In particular, it provides an arrangement whereby a microprocessor 11 can provide for instructions in an instruction stream that may have multiple overlapping trap shadows, associated with various trap barrier instruction classes, and stall the instruction pipeline only if an instruction of the corresponding class is in the trap shadow of an earlier instruction in the pipeline, by use of the partial trap barrier instruction. Accordingly, as long as instructions in an instruction stream, in an earlier instruction's trap shadow, are associated with other trap barrier classes than that for the earlier instruction, those instructions can be processed without stalling the pipeline, which can assist in enhancing processing throughput for the microprocessor 11.

It will be appreciated that a number of modifications may be made to the digital data processing system 10 and microprocessor 11 as described herein. For example, in addition to the partial trap barrier instruction, the microprocessor 11 can also process a trap barrier instruction, as described above, which can enable the pipeline to be stalled regardless of the particular trap barrier class associated with processing of the partial trap barrier instruction.

Furthermore, although various illustrative partial trap barrier classification criteria (i) through (iii) have been described, it will be appreciated that other criteria may be used.

In addition, it will be appreciated that the microprocessor 11 can implement several types of partial trap barrier instructions, each associated with one of the diverse illustrative partial trap barrier classification criteria (i) through (iii) as described above and/or other criteria.

Furthermore, although the microprocessor has been described as "issuing," that is, loading one instruction at a time, in its pipeline, it will be appreciated that the microprocessor can issue any number of instructions concurrently.

It addition, it will be appreciated that the invention may be used in connection with a pipeline having any number of stages or phases.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A processor configured to execute instructions in an instruction stream, at least some of the instructions being capable of giving rise to respective trap shadows, each of the at least some of the instructions capable of giving rise to respective trap shadows being associated with one of a plurality of trap barrier classes, the processor comprising:

A. an instruction execution control configured to control execution of said instructions in said instruction stream;

B. a trap barrier class indication generator configured to provide a trap barrier class indication for each of said trap barrier classes for which a trap shadow exists for the instructions whose execution is being controlled by said instruction execution control; and C. the instruction execution control including an execution stall control configured to stall execution of instructions in the instruction stream following a partial trap barrier instruction associated with a trap barrier class for which said trap barrier class indication generator is providing said trap barrier class indication, the instruction execution control being configured to not stall execution if the instructions following the partial trap barrier instruction are of a different class than that associated with the trap barrier class indication.

2. A processor as defined in claim 1 in which said instruction execution control controls execution of said instructions in a series of phases in a pipelined manner.

3. A processor as defined in claim 2 in which one of said phases is an execute phase, the execution stall control being configured to stall instructions in said instruction stream following a said partial trap barrier instruction associated with a trap barrier class for which said trap barrier class indication generator is providing said trap barrier class indication, in relation to the execute phase of the partial trap barrier instruction.

4. A processor as defined in claim 3 further comprising a pipeline buffer configured to buffer ones of said instructions being executed concurrently in a pipelined manner.

5. A processor as defined in claim 4 in which said pipeline buffer comprises a series of entries configured to buffer the instructions comprising a portion of the instruction stream being executed in said pipelined manner, each of said entries being associated with a respective phase, each instruction sequencing through said pipeline buffer as its execution proceeds through the successive phases.

6. A processor as defined in claim 5 in which while said execution stall control is configured to stall execution in response to said partial trap barrier instruction, said execution stall control being configured to stall sequencing of said instructions in said instruction stream following said partial trap barrier instruction through said series of entries.

7. A processor as defined in claim 2 in which said instruction execution control controls execution of a plurality of said instructions concurrently, at least some of the plurality of instructions that are being executed concurrently being in different phases of execution, said trap barrier class indication generator being configured to provide a trap barrier class indication for each of said trap barrier classes for which a trap shadow exists for the instructions being concurrently executed.

8. A processor as defined in claim 7 further comprising a pipeline buffer configured to buffer ones of said instructions being executed concurrently in a pipelined manner, said pipeline buffer comprising a series of entries configured to buffer the instructions comprising a portion of the instruction stream being executed in said pipelined manner, the trap barrier class indication generator being configured to provide for each trap barrier class a might trap indication for at least some of said entries while a respective one of said instruction therein have existing trap shadows.

9. A processor as defined in claim 8 in which said trap barrier class indication generator comprises a plurality of OR elements each associated with one of said trap barrier classes, each OR element being configured to receive the might trap indications associated with the respective class and generate a composite indication in response thereto, the composite indications generated by said OR elements being provided to said execution stall control as said trap barrier class indication.

10. A processor as defined in claim 1 in which at least one of the instructions in said instruction stream that is associated with a partial trap barrier class includes at least one field, the one of said trap barrier classes with which said instructions are associated being determined in relation to an encoding of at least a portion of said at least one field.

11. A processor as defined in claim 10 in which, in at least one of said instructions associated with a partial trap barrier class, said field is provided in each said instruction only to indicate the one of said trap barrier classes with which the instruction is associated.

12. A processor as defined in claim 1 further comprising a dynamic partial trap barrier class association element configured to associate at least one of the instructions in said instruction stream with a partial trap barrier class during execution of said at least one of the instructions.

13. A processor as defined in claim 12 further comprising a trap barrier class counter configured to provide a class count value, the instruction execution control being configured to execute said partial trap barrier instruction by incrementing said counter, the dynamic partial trap barrier class association element being configured to associate said at least one of the instructions in the instruction stream by tagging said at least one of the instructions with the current class count value of the trap barrier class counter.

14. A method of operating a processor for executing instructions in an instruction stream, at least some of the instructions being capable of giving rise to respective trap shadows, each of the at least some of the instructions capable of giving rise to respective trap shadows being associated with one of a plurality of trap barrier classes, the method comprising the steps of:

A. controlling execution of said instructions in said instruction stream;

B. providing a trap barrier class indication for each of said trap barrier classes for which a trap shadow exists for the instructions whose execution is being controlled during said instruction execution control step; and C. stalling execution of instructions in the instruction stream following a partial trap barrier instruction associated with a trap barrier class for which said trap barrier class indication is being provided, and not stalling execution if the instructions following the partial trap barrier instruction are of a different class than that associated with the trap barrier class indication.

15. A method as defined in claim 14 in which said instruction execution control step includes the step of controlling execution of said instructions in a series of phases in a pipelined manner.

16. A method as defined in claim 15 in which one of said phases is an execute phase, the execution stall control step including the step of stalling instructions in said instruction stream following a said partial trap barrier instruction associated with a trap barrier class for which said trap barrier class indication generator is providing said trap barrier class indication, in relation to the execute phase of the partial trap barrier instruction.

17. A method as defined in claim 16 including the step of buffering ones of said instructions being executed concurrently in a pipelined manner.

18. A method as defined in claim 17, the processor including a pipeline buffer comprising a series of entries for buffering the instructions comprising a portion of the instruction stream being executed in said pipelined manner, each of said entries being associated with a respective phase, the buffering step including the step of sequencing each instruction sequencing through said pipeline buffer as its execution proceeds through the successive phases.

19. A method as defined in claim 18 in which said execution stall control step includes the step of stalling the sequencing of said instructions in said instruction stream following said partial trap barrier instruction through said series of entries.

20. A method as defined in claim 15 in which said instruction execution control step includes the step of controlling execution of a plurality of said instructions concurrently, at least some of the plurality of instructions that are being executed concurrently being in different phases of execution, said trap barrier class indication generator providing a trap barrier class indication for each of said trap barrier classes for which a trap shadow exists for the instructions being concurrently executed.

21. A method, as defined in claim 20, of operating a processor, the processor further comprising a pipeline buffer for buffering ones of said instructions being executed concurrently in a pipelined manner, said pipeline buffer comprising a series of entries for buffering the instructions comprising a portion of the instruction stream being executed in said pipelined manner, the trap barrier class indication generation step including the step of providing for each trap barrier class a might trap indication for at least some of said entries while a respective one of said instruction therein have existing trap shadows.

22. A method as defined in claim 21 in which said trap barrier class indication generation step includes the step of generating a composite indication in response to the might trap indications associated with each respective class, the composite indications comprising said respective trap barrier class indications.

23. A method as defined in claim 14 in which at least one of the instructions in said instruction stream that is associated with a partial trap barrier class includes at least one field, the trap barrier indication generation step including the step of determining said trap barrier classes with which said instructions are associated in relation to an encoding of at least a portion of said at least one field.

24. A method as defined in claim 14 further comprising a dynamic partial trap barrier class association step for associating at least one of the instructions in said instruction stream with a partial trap barrier class during execution of said at least one of the instructions.

25. A method as defined in claim 24, the processor further comprising a trap barrier class counter for providing a class count value, the instruction execution control step including the step of executing said partial trap barrier instruction by incrementing said counter, the dynamic partial trap barrier class association step including the step of associating said at least one of the instructions in the instruction stream by tagging said at least one of the instructions with the current class count value of the trap barrier class counter.

26. A computer program product for use in connection with a digital computer for controlling execution instructions in an instruction stream, at least some of the instructions being capable of giving rise to respective trap shadows, each of the at least some of the instructions capable of giving rise to respective trap shadows being associated with one of a plurality of trap barrier classes, the computer program product comprising a computer-readable medium having encoded thereon:
  A. an instruction execution control module configured to enable said computer to execute said instructions in said instruction stream;
  B. a trap barrier class indication generator module configured to enable said computer to provide a trap barrier class indication for each of said trap barrier classes for which a trap shadow exists for the instructions whose execution is being controlled by said instruction execution control; and
  C. the instruction execution control module including an execution stall control module configured to enable said computer to stall execution of instructions in the instruction stream following a partial trap barrier instruction associated with a trap barrier class for which said trap barrier class indication is provided, the instruction execution control module being configured to the instruction execution control being configured to enable the computer to continuing execution if the instructions following the partial trap barrier instruction are of a different class than that associated with the trap barrier class indication.

27. A computer program product as defined in claim 26 in which said instruction execution control module is configured to enable said computer to execute of said instructions in a series of phases in a pipelined manner.

28. A computer program product as defined in claim 27 in which one of said phases is an execute phase, the execution stall control module being configured to enable said computer to stall instructions in said instruction stream following a said partial trap barrier instruction associated with a trap barrier class for which said trap barrier class indication generator is providing said trap barrier class indication, in relation to the execute phase of the partial trap barrier instruction.

29. A computer program product as defined in claim 28, the computer further comprising a pipeline buffer configured to buffer ones of said instructions being executed concurrently in a pipelined manner, said pipeline buffer comprising a series of entries configured to buffer the instructions comprising a portion of the instruction stream being executed in said pipelined manner, each of said entries being associated with a respective phase, each instruction sequencing through said pipeline buffer as its execution proceeds through the successive phases, said execution stall control module being configured to enable said computer to stall sequencing of said instructions in said instruction stream following said partial trap barrier instruction through said series of entries.

30. A computer program product as defined in claim 27 in which said instruction execution control module is configured to enable said computer to execute of a plurality of said instructions concurrently, at least some of the plurality of instructions that are being executed concurrently being in different phases of execution, said trap barrier class indication generator module being configured to enable said computer to provide a trap barrier class indication for each of said trap barrier classes for which a trap shadow exists for the instructions being concurrently executed.

31. A computer program product as defined in claim 30, the computer further comprising a pipeline buffer configured to buffer ones of said instructions being executed concurrently in a pipelined manner, said pipeline buffer comprising a series of entries configured to buffer the instructions comprising a portion of the instruction stream being executed in said pipelined manner, the trap barrier class indication generator module being configured to enable the computer to provide for each trap barrier class a might trap indication for at least some of said entries while a respective one of said instruction therein have existing trap shadows.

32. A computer program product as defined in claim 31 in which said trap barrier class indication generator module is configured to enable said computer to provide a plurality of OR elements each associated with one of said trap barrier classes, each OR element receiving the might trap indications associated with the respective class and generating a composite indication in response thereto, the composite indications generated by said OR elements being provided as said trap barrier class indication.

33. A computer program product as defined in claim 26 in which at least one of the instructions in said instruction stream that is associated with a partial trap barrier class includes at least one field, the one of said trap barrier classes with which said instructions are associated being determined in relation to an encoding of at least a portion of said at least one field.

34. A computer program product as defined in claim 33 in which, in at least one of said instructions associated with a partial trap barrier class, said field is provided in each said instruction only to indicate the one of aid trap barrier classes with which the instruction is associated.

35. A computer program product as defined in claim 26 further comprising a dynamic partial trap barrier class association module configured to enable the computer to associate at least one of the instructions in said instruction stream with a partial trap barrier class during execution of said at least one of the instructions.

36. A computer program product as defined in claim 35 further comprising a trap barrier class counter module configured to enable said computer to provide a class count value, the instruction execution control module being configured to enable the computer to execute said partial trap barrier instruction by incrementing said counter, the dynamic partial trap barrier class association module being configured to enable the computer to associate said at least one of the instructions in the instruction stream by tagging said at least one of the instructions with the current class count value of the trap barrier class counter.

* * * * *

UNITED STATES PATENT AND TRADEMARK OFFICE
CERTIFICATE OF CORRECTION

PATENT NO. : 6,295,601 B1  
DATED : September 25, 2001  
INVENTOR(S) : Guy L. Steele, Jr.

Page 1 of 1

It is certified that error appears in the above-identified patent and that said Letters Patent is hereby corrected as shown below:

<u>Title page,</u>  
Assignee, replace "Sun Micro Systems, Inc." with -- Sun Microsystems, Inc. --.

Signed and Sealed this

Fourteenth Day of May, 2002

*Attest:*

JAMES E. ROGAN  
*Attesting Officer*     *Director of the United States Patent and Trademark Office*